June 9, 1953 — N. C. PARRISH — 2,641,672
ELECTRIC CONDUCTOR
Filed May 8, 1950 — 4 Sheets-Sheet 1

INVENTOR.
NORMAN C. PARRISH
BY
Herbert E. Metcalf
HIS PATENT ATTORNEY

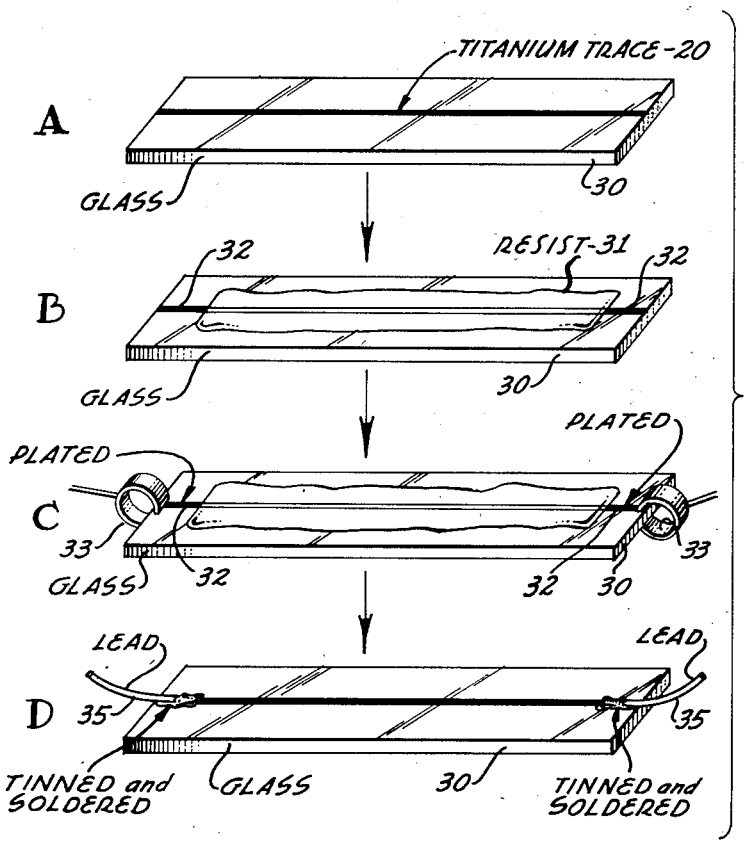
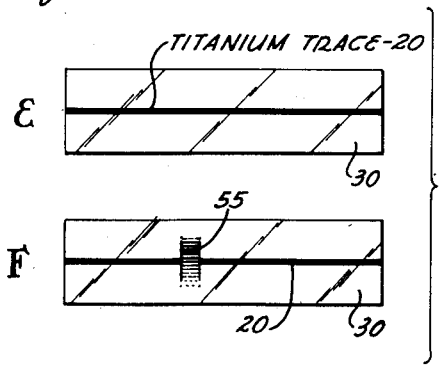
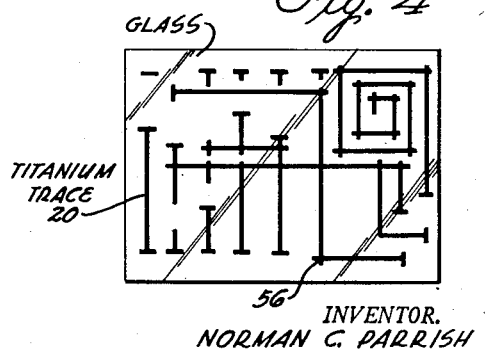

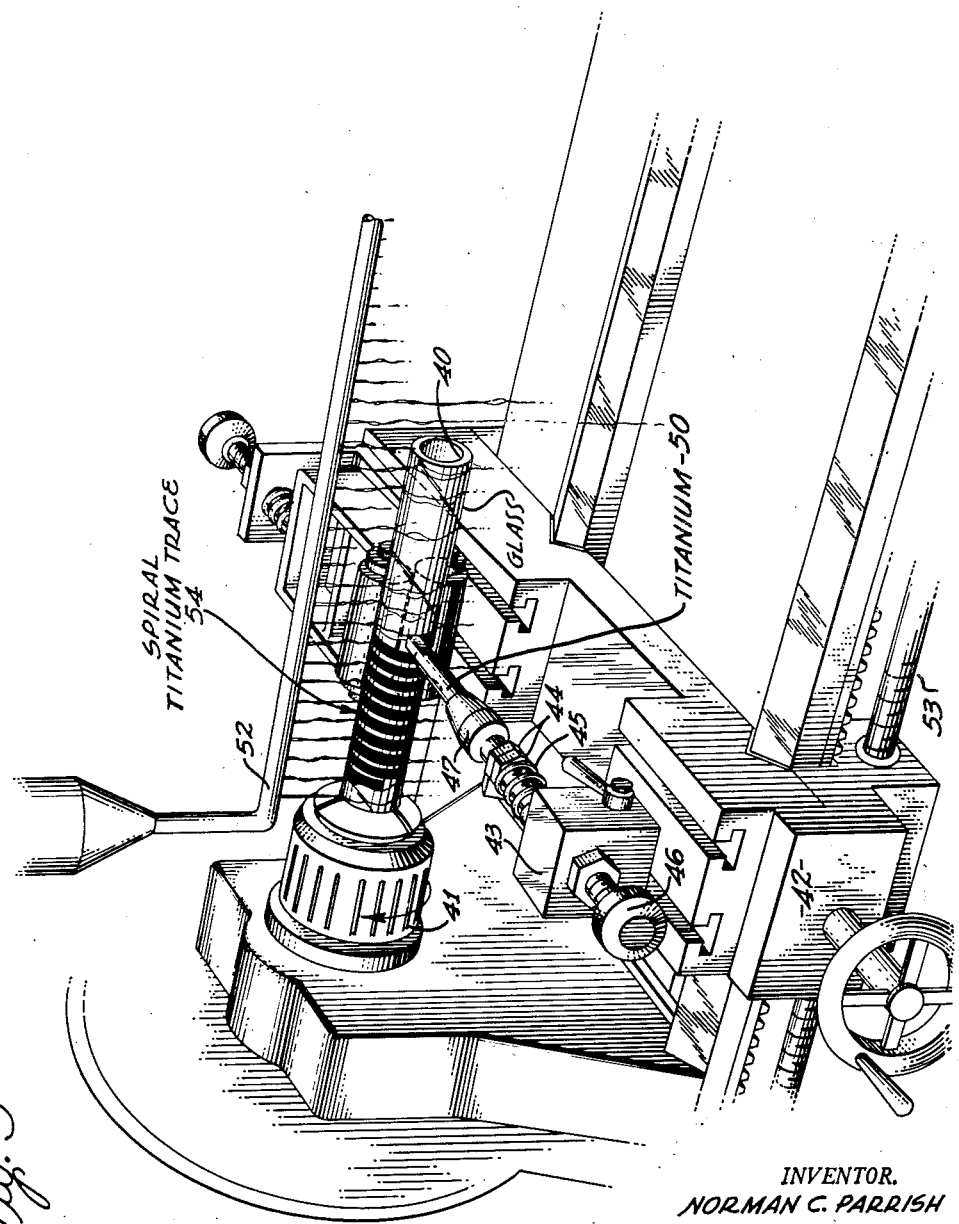

June 9, 1953     N. C. PARRISH     2,641,672
ELECTRIC CONDUCTOR
Filed May 8, 1950     4 Sheets-Sheet 4
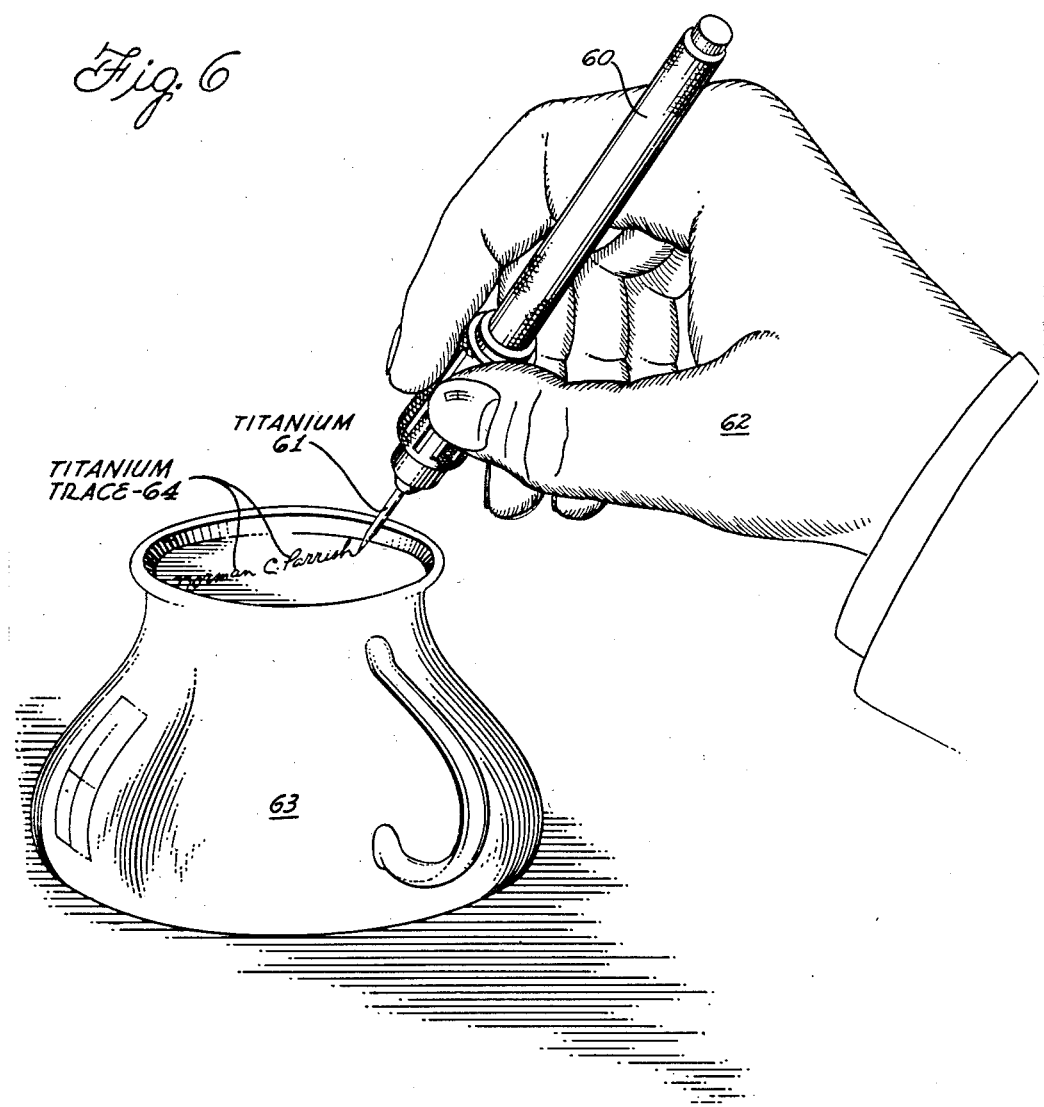
INVENTOR.
NORMAN C. PARRISH
BY
HIS PATENT ATTORNEY Patented June 9, 1953

2,641,672

UNITED STATES PATENT OFFICE 2,641,672

ELECTRICAL CONDUCTOR

Norman C. Parrish, Redondo Beach, Calif., assignor to Northrop Aircraft, Inc., Hawthorne, Calif., a corporation of California Application May 8, 1950, Serial No. 160,609

4 Claims. (Cl. 201—63)

My invention relates to electrical conductors and, more particularly, to a means and method for friction bonding a film or trace of an electrical conductive metal to a smooth, hard surface.

I have found that metallic titanium, when moved over a polished surface of a material equal to or greater in hardness than titanium metal (about Vickers 60–115) under pressure at room temperature, leaves a trace or film of metallic titanium on the smooth surface. I have further found that this film or trace is intimately and strongly bonded to the surface to which it is applied and that when the trace is applied to a smooth surface of electrical insulators such as glass, glazed ceramics, and quartz in its various forms, for example, the trace, when properly made, is continuously electrically conductive, and of an electrical resistivity suitable for resistor manufacture, if desired. When plated with metals of higher conductivity, such as copper or silver, the trace assumes the conductivity of these metals. Electrical circuits can thus be made on insulating bases, such circuits incorporating high conductivity plated portions and low conductivity resistor portions, as may be desired.

In addition, titanium traces can readily be made on a smooth surface of metals as hard or harder than titanium and, due to the fact that certain acids will attack the base metal and not the titanium trace, the trace can be used as an etching resist. A further advantage of the use of a friction bonded titanium trace is that friction bonding pressures are readily obtained by hand so that materials such as glass, ceramic and quartz can be hand marked with a titanium point in patterns or to form numbers, letters, signatures, or other symbols, as desired, on the smooth surfaces of such materials.

Evidence has been obtained that the friction bond is permanent, that the trace cannot be removed other than by abrading or chemically dissolving away the titanium, and that the trace is so firmly bonded that the temperature effects are those of the base material only.

It is important to note that the characteristics just above described are obtained by friction bonding alone at room temperature, and that it is neither necessary nor desirable to apply heat or other processes to the finished trace to fuse the metal to the substrate, as such fusion is obtained directly in making the trace. Only four conditions are critical in forming the trace: the surface must be smooth; the surface must be completely oil and grease free; the surface must be as hard as or harder than the titanium tool; and the pressure applied to the tool must be sufficient to cause the trace to form on the smooth surface.

It is an object of the invention to provide a means and method of making a continuously conductive titanium trace having the characteristics outlined just above.

Other objects and advantages of the present invention will be apparent by reference to the following description of the appended drawings, in which:

Figure 2 shows in perspective four steps in making a resistor from a titanium trace made by the device of Figure 1.

Figure 3 is a perspective view of apparatus for forming a spiral trace on an insulating base such as a glass tube.

Figure 4 is a diagrammatic view of an electrical circuit ruled on a glass plate by apparatus similar to that shown in Figure 1.

Figure 5 is a plan view showing how a trace can be interrupted as by grinding.

Figure 6 is a perspective view of a titanium pencil in use.

Figure 1:
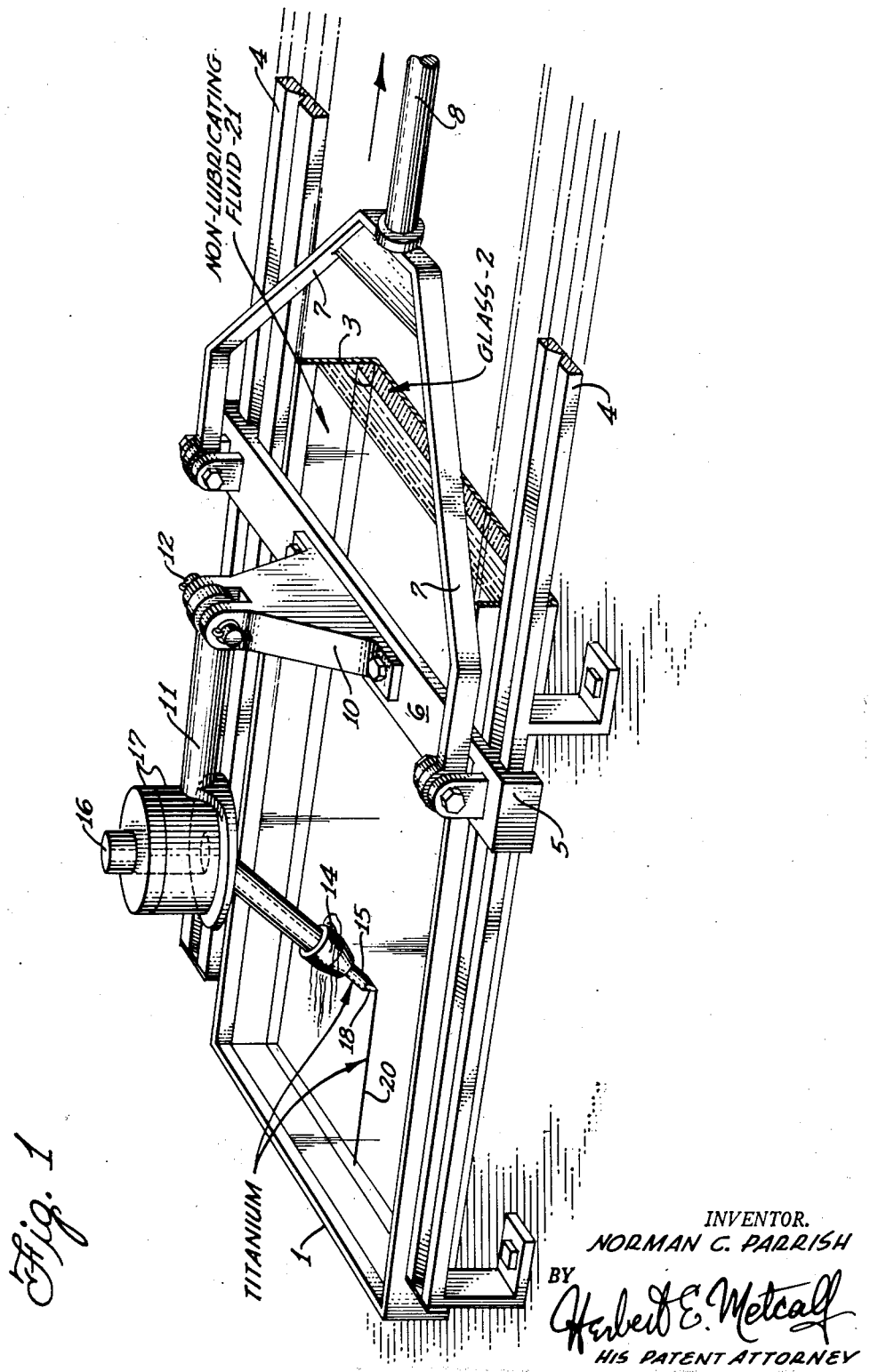
Figure 1 is a perspective view of one form of apparatus used to practice the method of the present invention.

Referring first to Figure 1, which shows one form of apparatus the method of the invention may take to perform, a shallow walled tank 1 is supported on a suitable foundation. Resting on the bottom of the tank is a sheet 2 of insulating material such as glass, ceramic or quartz or the like having a smooth surface 3 uppermost. This surface may be polished, for example, with a smooth finish such as that of plate glass or polished quartz, or may be fire polished such as the surfaces existing on blown glass or glazed ceramic.

A pair of guides 4 are positioned on each side of tank 1 supporting a pair of slide blocks 5 bridged by a crosspiece 6 extending across tank 1. Slide blocks 5 and cross piece 6 may be moved along guides 4 by the use of a yoke 7 and draw bar 8. Progression can be by hand or power, as desired.

A bracket 10 is provided on crosspiece 6 extending upwardly therefrom, this bracket having a trailing arm 11 pivoted thereto as by pin 12. Trailing arm 11, after extending rearwardly, extends downwardly to terminate in a chuck 14 in such a position that the end of a metallic titanium tool 15 is held in chuck 14 rests on smooth surface 3. In order that a predetermined pressure can be placed on the tool-surface contact, arm 11 is provided with a weight pin 16 on which can be placed weights 17 of various sizes. Preferably, but not necessarily, tool 15 is sharpened to have a chisel edge, with the edge thereof resting on surface 3 and with the angle side 18 trailing. The width of the tool edge is normal to the direction of motion thereof and determines the width of the trace.

The surface 3 to which the trace is to be bonded is cleaned by any desired method to be as oil and grease free as possible. Weights are adjusted to provide pressures of from 5,000 to 50,000 lbs. per square inch, for example, on the tool contact. The drawbar 8 is then operated to cause the tool to move along the sheet under pressure to leave a metallic titanium trace 20 thereon. Pressure is not critical. Too light a pressure leaves no trace at all, a pressure almost sufficient causes a ragged trace, whereas too high a pressure provides a good trace, but tends to burr the titanium tool. The proper weights to form good traces are readily found by adding weights to pin 16 irrespective of the width of the trace or reference to pounds-per-square-inch calculations. Some excess weight is advisable, as the contact area will increase as metal is deposited on the sheet surface. Such excess weight does not appear to increase the thickness of the deposited trace.

As it is sometimes difficult to uniformly degrease the surface 3 and as this surface may become contaminated when exposed, I prefer to maintain a covering layer 21 of a non-lubricating cleaning fluid such as carbon tetrachloride, or other fluid dissolving oily substances over the surface during the tracing process. The final wiping of the surface 3 may be performed under the solvent layer, and the same liquid left there while the trace is being made. Such a procedure, however, is not a requirement for making a properly bonded trace, as the metal will bond to a clean, dry surface, although the most uniform traces are made under a liquid. If the surface 3 is clean, any non-lubricating fluid is satisfactory, such as water, for example, surrounding the tool contact. I am at present unable to state the exact function of the liquid, but it may provide uniform cooling of the tool, or may exclude oxygen from the contact area.

I am also unable to state at this time the exact process by which the titanium in the trace is bonded to the metal, glass, ceramic, or quartz surface. It may well be that the extreme heat of the high, almost instantaneous friction existing at the contact point while the trace is being made, welds or fuses the metal to the surface. In any event, the trace is firmly bonded to the surface and cannot be removed without abrading away or chemically dissolving the deposited titanium.

The resultant trace is very uniform, electrically continuous, and of relatively high electrical resistance. Traces have been made .03 inch wide, and have been measured to have a resistance of 5,000 ohms per inch. The metal deposited is sufficiently thick to be opaque to visible light and rough measurement shows the thickness to be relatively uniform and in the neighborhood of one ten-thousandth of an inch thick when deposited and bonded as described above. Curved traces can be made with a pantograph, but it is more difficult to maintain a uniform trace width, and I prefer straight line tracing where trace widths are important, as in the formation of resistors.

It should be pointed out herein that the titanium trace as above described is not the same as a trace made on a rough surface in a manner similar to a mark made on a rough surface by a lead pencil. When the titanium tool is moved over a rough surface the titanium will mark it by being abraded off and deposited in the low spots of the roughened surface.

This latter type of trace is neither uniform nor continuously conductive, as is the friction bonded trace made on a smooth surface. In consequence, the smoother the surface on which the trace is made, the more uniform the trace will be. Minute spaced scratches in the smooth surface are, however, filled up and bridged. The surfaces of window and plate glass, and of ceramics such as glazed china and the like used for eating utensils, as commercially produced, are excellent surfaces for the practice of the present invention.

The traces, when finally made, may be used, for example, to form precision resistors for use in electrical circuits, for example, as shown in Figures 2A, B, C, and D.

Referring first to Figure 2A, the titanium trace 20 has been bonded as by the use of the device shown in Figure 1, to a glass base 30 originally of extended length, the glass then being cut to include a desired length of trace thereon, known to be longer than the length providing a desired electrical resistance. The proper length of trace for the resistance desired is determined by direct measurement between contacts spaced on the trace. The portion of the trace to be used as a resistance is then covered by a layer 31 of plating bath resist, as is well known in the art, this layer being shown in Figure 2B. Electrical contacts are then made to the exposed ends 32 of the trace, as by spring clips 33, and these exposed ends are plated, as with copper or silver as may be desired, as shown in Figure 2C.

The resist 31 may be left on or removed as shown in Figure 2D, and the plated ends 32 are then tinned so that leads 35 can be soldered thereto for external connections, for example. If less accuracy is desired, spring clip connections to the ends of the trace can be used for permanent connections. In either event, the resistor, after connections have been made, may be protected as is usual in resistors, if desired, by dipping in an insulating, time setting composition.

Titanium trace conductors can also be made in spiral form as shown in Figure 3. In this case a glass rod or tube 40 is mounted in a lathe chuck 41 for rotation thereby. A tool carriage 42 of the lathe is fitted with a tool block 43 carrying a tool rod 44 forced toward the glass tube 40 by a spring 45 whose compression is regulated by nut 46. A tool chuck 47 is mounted on rod 44, this chuck 47 carrying a titanium tool 50 similar to that shown in Figure 1, spring 45 providing the pressure required for friction bonding the titanium to the glass tube surface at the area of contact. Because the tool pressure might break tube 40, back up rollers 51 may be provided opposite the tool to take the pressure off the chucked end of the glass tube 40. As in the device of Figure 1, the surface of the glass tube 40 should be clean, and I prefer to cover the tube 40 with solvent or other non-lubricating fluid during the bonding process, as by flowing solvent over the tube from solvent pipe 52.

After pressure has been established, the lathe is started to rotate tube 40 and the tool 50 is progressed along the tube by lathe lead screw 53 to provide a friction bonded spiral trace 54 on tube 40 with any desired turn spacing. The spiral titanium trace 54 can then be entirely plated as with silver to provide a low resistance inductance, or to have end, or end and intermediate, plated connection areas so that the trace can be used as a resistance or tapped resistance.

Figure 4 shows a complete circuit ruled on a sheet of glass, with the titanium traces ruled in two dimensions. Discontinuities in the traces can be made in two ways; either by lifting the titanium tool, or by abrading the trace as shown in Figure 5. Here, in Figure 5E, a continuously conductive trace 20 is shown, and in Figure 5F this trace has been interrupted by the application of an abrading wheel to area 55. Either method is satisfactory. However, glass plates can be ruled in a square grid pattern, with the grid traces interrupted by abrasion in such locations as to provide a desired circuit. Thus, one trace pattern can be used for a number of different circuits, as may be desired.

In the circuit formed from the titanium friction bonded traces as shown in Figure 4, trace ends, intermediate areas, or the entire trace pattern can be plated to provide low resistance paths, and, if desired, certain lengths of trace can be left unplated in the circuit to provide resistances in the circuit, the length of the unplated portions and their width determining the resistance. As the titanium tool will deposit its trace on a previous trace, traces at right angles to each other are electrically conductive where they cross as at 56 in Figure 4.

Due to the fact that the pressures required for the friction bonding of titanium to a smooth surface are readily obtained by hand when a tool of small contact area is used, a titanium "pencil" can be used for the permanent marking of glass, quartz, dinnerware or the like, as shown in Figure 6. Here a handle 60 is provided with a titanium point 61, in this case shaped, for example, like the well-known phonograph needle. The pencil is then held in the hand 62, the point pressed firmly against a surface of the article to be marked, in this case a drinking cup 63, and the desired trace 64 made on the cup. For this type of work no point covering liquid is necessary and the surface of the cup or the like can be dry. Cleansing, such as washing with any good detergent, provides a sufficiently clean surface.

The titanium traces bonded to smooth surfaces as described above have a bright silvery color and do not tarnish or discolor in ordinary atmospheres. They are thoroughly bonded to their base and when properly made, following the teachings of the present invention, are continuously and uniformly electrically conductive. The resistance of the traces is sufficiently high to be useful as a resistor, yet the traces are sufficiently conductive so that satisfactory plating as with silver or copper can be readily accomplished to provide conductors thoroughly bonded to hard insulators without a separate fusion step.

Because of the strong friction bond made between the trace and its base, the trace does not tear away from the surface when subjected to extreme temperature cycling, and for all practical purposes, the combination of the trace as bonded to the insulating base behaves as if the temperature effects were those of the base alone.

While I have described my invention as primarily adapted for use on smooth surfaces of electrical insulators, titanium traces can be pressure bonded to smooth surfaces of metals as hard as or harder than the titanium tool, and because of different chemical reactions can be useful. For example, excellent titanium traces can be made on mild steel by the method disclosed herein. The steel surface can then be etched by hydrochloric acid which does not attack the titanium. A raised portion corresponding to the trace area is thus formed, the titanium acting, in this case, as an etching resist for the steel. Other uses for the friction bonded titanium traces formed by the method herein disclosed will be apparent to those skilled in the art, and I do not desire to be limited to the uses disclosed herein as illustrating the practice of the method of my invention.

While I have herein described the titanium traces as being straight and made by a device that can be called a ruling engine, it is to be distinctly understood that curved titanium traces can readily be made by hand, or preferably by the use of a device such as a pantograph, for example. Thus, I do not desire to be limited in the practice of my invention in any manner to any particular form of trace extent or contour.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is, therefore, claimed in any of its forms or modifications within the legitimate and valid scope of the appended claims.

I claim:

1. An insulated electrical conductor comprising a ceramic foundation member having a highly polished surface, a continuously conductive trace of titanium metal on said polished surface, said trace being friction bonded only to said polished surface, a layer of conductive material plated on said trace at at least two points spaced along said trace, and conductive connections fastened to said conductive plated layer.

2. An insulated conductor comprising a base material at least as hard as metallic titanium and having a smooth surface, a layer of titanium metal friction bonded to said surface, and a layer of a metal more conductive than titanium bonded to said titanium layer.

3. An insulated conductor comprising a base material at least as hard as metallic titanium and having a smooth surface, a layer of titanium metal friction bonded to said surface, and a layer of a metal more conductive than titanium plated on said titanium layer.

4. An electrical circuit including both high and low resistance portions, which comprises a ceramic foundation member having a polished surface, a continuously conductive high resistance trace of titanium metal friction-bonded on said polished surface to include the form of the circuit desired, and a layer of a conductive low resistance metal plated on said titanium trace at at least two predetermined portions spaced along said trace, to obtain the desired resistance between said plated portions.

NORMAN C. PARRISH.

References Cited in the file of this patent

UNITED STATES PATENTS

| Number | Name | Date |
|---|---|---|
| 527,210 | Margot | Oct. 9, 1894 |
| 1,445,610 | Brockway | Feb. 13, 1923 |
| 1,702,062 | Sonkin | Feb. 12, 1929 |
| 1,983,267 | Browne et al. | Dec. 4, 1934 |
| 2,021,661 | Kisfaludy | Nov. 19, 1935 |
| 2,292,026 | Gillett | Aug. 4, 1942 |
| 2,328,626 | Dowling | Sept. 7, 1943 |
| 2,433,384 | McLarn | Dec. 30, 1947 |
| 2,475,379 | Stong | July 5, 1949 |
| 2,485,737 | Jacoby | Oct. 25, 1949 |
| 2,538,945 | Mortell | Jan. 23, 1951 |
| 2,547,022 | Leno | Apr. 3, 1951 |

FOREIGN PATENTS

| Number | Country | Date |
|---|---|---|
| 268,840 | Great Britain | Aug. 25, 1927 |